United States Patent
He

(10) Patent No.: US 8,529,388 B2
(45) Date of Patent: Sep. 10, 2013

(54) MECHANICAL TENSIONER WITH DAMPING FEATURE

(75) Inventor: Simon Xunnan He, Troy, MI (US)

(73) Assignee: Schaeffler Technologies AG & Co, KG, Herzogenaurach (DE)

( * ) Notice: Subject to any disclaimer, the term of this patent is extended or adjusted under 35 U.S.C. 154(b) by 299 days.

(21) Appl. No.: 12/886,043

(22) Filed: Sep. 20, 2010

(65) Prior Publication Data

US 2011/0105257 A1    May 5, 2011

Related U.S. Application Data

(60) Provisional application No. 61/256,452, filed on Oct. 30, 2009.

(51) Int. Cl.
*F16H 7/08* (2006.01)

(52) U.S. Cl.
USPC .......................... 474/111; 474/101; 474/140

(58) Field of Classification Search
USPC ............... 474/111, 101, 109, 110, 112, 113, 474/117, 118, 136, 138; 188/129
See application file for complete search history.

(56) References Cited

U.S. PATENT DOCUMENTS

| | | | | |
|---|---|---|---|---|
| 2,595,115 A | * | 4/1952 | Wiley | 451/41 |
| 3,866,724 A | * | 2/1975 | Hollnagel | 188/129 |
| 4,698,049 A | * | 10/1987 | Bytzek et al. | 474/135 |
| 5,720,683 A | | 2/1998 | Patton | |
| 5,772,549 A | * | 6/1998 | Berndt et al. | 474/135 |
| 5,795,257 A | * | 8/1998 | Giese et al. | 474/109 |
| 5,797,818 A | | 8/1998 | Young | |
| 5,951,423 A | * | 9/1999 | Simpson | 474/109 |
| 6,406,391 B1 | | 6/2002 | Ullein | |
| 6,609,986 B1 | | 8/2003 | Wigsten | |
| 6,994,644 B2 | * | 2/2006 | Yoshida et al. | 474/110 |
| 7,455,606 B2 | | 11/2008 | Markley et al. | |
| 7,513,843 B2 | | 4/2009 | Markley et al. | |
| 2003/0069098 A1 | * | 4/2003 | Serkh et al. | 474/135 |
| 2008/0119311 A1 | * | 5/2008 | Wilhelm et al. | 474/135 |

FOREIGN PATENT DOCUMENTS

| | | | |
|---|---|---|---|
| DE | 4300178 | * | 1/1993 |
| DE | 4300178 C1 | * | 4/1994 |

* cited by examiner

*Primary Examiner* — Sang Kim
*Assistant Examiner* — Dorin Cojocariu
(74) *Attorney, Agent, or Firm* — Volpe and Koenig, P.C.

(57) ABSTRACT

A mechanical tensioner for a traction drive element is provided. It includes a housing with a bore having an open end and a closed bottom. A plunger having a first end is located in the bore. The first end of the plunger has a tapered slot or tapered opening defined therein forming a hollow wall portion of the plunger. The hollow wall portion is discontinuous in a circumferential direction. A wedge insert is located at least partially in the slot or opening. The wedge insert has an outer surface with a contact area that is complementary to the tapered slot or tapered opening. A spring is located between the wedge insert and closed bottom of the housing. The spring forces the wedge insert into the tapered slot or tapered opening with an increase in force as the plunger is depressed into the bore in the housing. This forces the hollow wall portion outwardly in order to provide a friction damping feature that increases with the distance that the plunger is depressed.

7 Claims, 1 Drawing Sheet

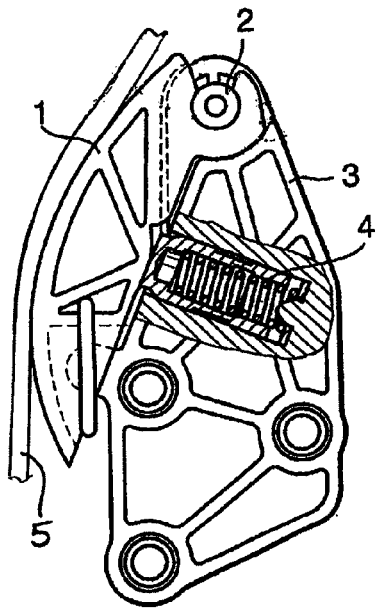
Fig. 1
(PRIOR ART)
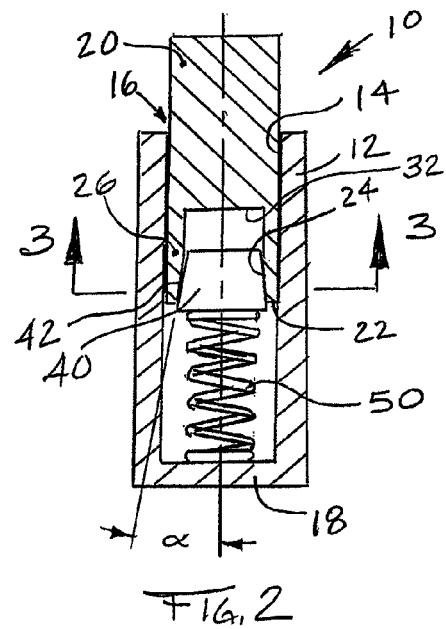
FIG. 2
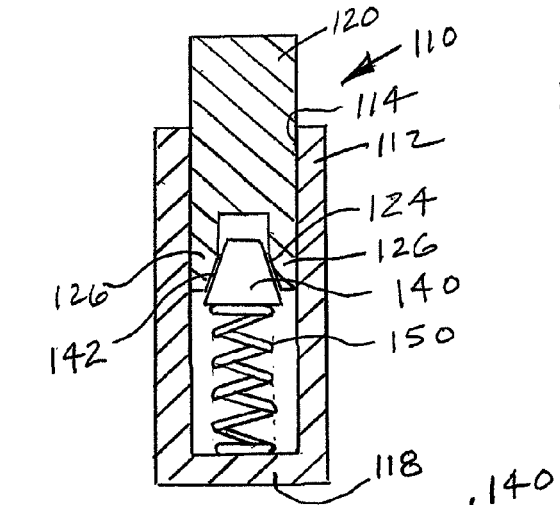
FIG. 3
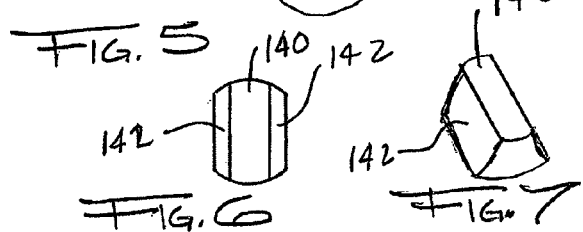
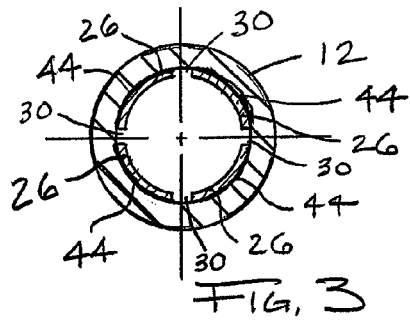
FIG. 5
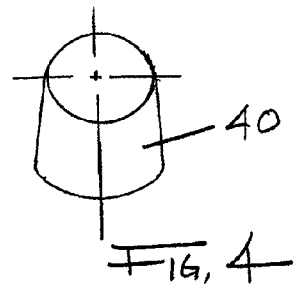
FIG. 6   FIG. 7

MECHANICAL TENSIONER WITH DAMPING FEATURE

CROSS REFERENCE TO RELATED APPLICATIONS

This application is a Non-Provisional which claims the benefit of U.S. Provisional Application No. 61/256,452, filed Oct. 30, 2009, which is incorporated herein by reference as if fully set forth.

BACKGROUND

The present invention relates to the field of tensioning devices for traction drive elements, such as chains or belts, and in particular is directed to tensioning devices used in connection with tensioning the timing chain or belt for an internal combustion engine.

Chain tensioners for traction drive elements for a timing chain or timing belt drive are known and are also used in connection with traction drive elements for various auxiliary units, such as the generator, power steering pump, air conditioning pump as well as other auxiliary units commonly used on internal combustion engines. The know devices, for example such as shown in U.S. Pat. No. 5,720,683 or U.S. Pat. No. 6,406,391 utilize a plunger located within the bore of a fixed housing which acts on a tensioning shoe to press against the inner or outer run of a traction drive element in order to reduce slack and/or skipping of the traction element on a sprocket or toothed pulley. These known devices utilize a spring in order to press the plunger and associated tensioning shoe toward the tension element. However, they generally lack damping features in order to more effectively attenuate vibrations.

Other known tensioners utilize a ratcheting device in connection with the plunger in order to prevent return motion of the plunger once it has extended past an additional detent or notch on the ratchet. Prior art examples include U.S. Pat. No. 7,513,843 and U.S. Pat. No. 7,455,606.

Additionally, other tensioning devices utilize a blade or leaf spring in connection with the tensioning shoe in order to provide the tensioning function, for example as shown in U.S. Pat. No. 6,609,986 and U.S. Pat. No. 5,797,818.

None of these devices provide a controlled damping feature that allows for improved functioning of the tensioning device so that it not only reduces slack in the traction element, but further dampens vibrations.

SUMMARY

A mechanical tensioner for a traction drive element is provided. It includes a housing with a bore having an open end and a closed bottom. A plunger having a first end is located in the bore. The first end of the plunger has a tapered slot or tapered opening defined therein forming a hollow wall portion of the plunger. The hollow wall portion is discontinuous in a circumferential direction. A wedge insert is located at least partially in the slot or opening. The wedge insert has an outer surface with a contact area that is complementary to the tapered slot or tapered opening. A spring is located between the wedge insert and closed bottom of the housing. The spring forces the wedge insert into the tapered slot or tapered opening with an increase in force as the plunger is depressed into the bore in the housing, forcing the hollow wall portion outwardly in order to provide a friction damping feature that increases with the distance that the plunger is depressed.

Other aspects of the invention are defined below and in the claims and have not been repeated in the for the sake of brevity. Those skilled in the art will recognize that one or more of the features can be used alone or in combination in order to provide a damping feature in a plunger-type mechanical tensioner for a traction drive element that is simple to assemble and of low cost.

BRIEF DESCRIPTION OF THE DRAWINGS

The foregoing summary and the following detailed description will be better understood when read in conjunction with the appended drawings, which illustrate preferred embodiments of the invention. In the drawings:

FIG. 1 is an elevational view, partially in cross-section, showing a mechanical tensioner for a traction drive element in accordance with the prior art.

FIG. 2 is a cross-sectional view through a mechanical tensioner in accordance with the present invention.

FIG. 3 is a cross-sectional view taken along the lines 3-3 in FIG. 2.

FIG. 4 is a perspective view of the wedge insert used in the mechanical tensioner according to FIG. 2.

FIG. 5 is a second embodiment of a mechanical tensioner in accordance with the present invention.

FIG. 6 is a top view of the wedge insert used in the second embodiment of the mechanical tensioner shown in FIG. 5.

FIG. 7 is perspective view of the wedge insert of FIGS. 5 and 6.

DETAILED DESCRIPTION OF THE PREFERRED EMBODIMENTS

Certain terminology is used in the following description for convenience only and is limiting. The words "front," "rear," "upper" and "lower" designate directions in the drawings to which reference is made. The words "inwardly" and "outwardly" refer to the directions toward and away from the parts referenced in the drawings. A "traction drive element" refers to a belt or chain that extends between pulleys or sprockets, respectively, to transfer rotary force. A reference to a list of items that are cited as "at least one of a, b or c" (where a, b or c represent the items being listed) means any single one of the items a, b or c, or combinations thereof. The terminology includes the word specifically noted above, derivatives thereof and words of similar import.

The present invention provides a mechanical tensioner 10, 110, shown in FIGS. 2 and 5 that is used for tensioning a traction drive element, for example a timing belt or timing chain of an internal combustion engine. A prior art tensioner is shown in FIG. 1 that includes a tension shoe 1 that is mounted on a pivot axle 2 for pivoting relative to a base 3. A spring element 4 is arranged between the tension shoe 1 and the base element 3 and is supported with one end on the base element and the other end forcing the tension shoe 1 against the traction drive element 5. Other arrangements are known in which the spring element linearly displaces a tension shoe as opposed to pivotable displacement.

In the first embodiment of the present invention, shown in FIGS. 2-4, the tensioner 10 is shown without the tension shoe and with a housing 12 which can be an integral part of or inserted into a base element, such as the base element 3 shown in FIG. 1. Housing 12 includes a bore 14 having an open end 16 and closed bottom 18. The housing 12 can be made of deep drawn sheet metal which is inserted into a polymeric or metal base 3 or can be formed integrally with a base having connection points for connection to the block or an auxiliary bracket of an internal combustion engine or other device where a mechanical tensioner is required.

A plunger 20 having a first end 22 is located within the bore 14. The first end 22 of the plunger 20 has tapered slot or tapered opening 24 defined therein forming a hollow wall portion 26 at the first end 22 of the plunger 20. In the first embodiment shown in FIGS. 2-4, a tapered opening 24 is provided and the hollow wall portion 26 forms a sleeve 28 having at least one axially extending slot 30 defined therein. In the preferred embodiment there are four axially extending slots 30, as shown in FIG. 3, which are spaced apart generally equally in a circumferential direction. These slots 30 preferably extend up to the base 32 of the tapered opening 24.

As shown in FIG. 2, in the first preferred embodiment of the mechanical tensioner 10, the tapered opening 24 defines an angle α with respect to a longitudinal axis 34 of the plunger 20 which is in the range about 5° to about 45°. More preferably, α is in the range of about 10° to 25°. In one preferred embodiment, the angle α is preferably about 15°.

The plunger 20 can be made from a metallic or polymeric material. It can also be formed as a deep drawn sheet metal part with the tapered opening 24 being formed in a separate step after the formation of the plunger body. The slots 30 are preferably also formed in a separate step and, based on the separation between the segments of the sleeve 28 due to the slots 30, allow the segments of the hollow wall portion 26 to be elastically deflectable in an outward direction.

Still with reference to FIGS. 2-4, a wedge insert 40 is located at least partially in the tapered slot or opening 24. In the first preferred embodiment shown in FIGS. 2-4, the tapered opening 24 is preferably conical in form and the wedge insert 40 has an outer surface 42 with a contact area that is complementary to the tapered opening 24. Thus, the wedge insert 40 preferably has a frustoconical form as shown most clearly in FIG. 4. A coating can be provided on the outer surface 42 of the wedge insert 40 or on the tapered surface of the opening 24 in order to adjust the amount of friction generated. Alternatively, or in addition, the material selection and finish for both the plunger 20 and the wedge insert 40 can take into account the respective coefficients of friction.

A spring 50 is located between the wedge insert 40 and the closed bottom 18 of the housing 12. The spring 50 is preferably a compression spring, although other types of springs could utilized, if desired. Friction pads or a friction coating 44 are preferably located on an outer surface of the hollow wall portion 26 that is slidingly engaged in the bore 14 of the housing 12.

In use, the mechanical tensioner 10 provides a damping function in that any inward force on the plunger 20 compresses the spring 50 which forces the wedge insert 40 into the tapered opening 24, expanding the segmented sections (separated by the slots 30) of the hollow wall portion 26 outwardly against the inside of the bore 14. The amount of damping can be controlled depending upon the spring constant as well as the type of friction coating or pads 44 utilized. The greater the displacement of the plunger 20, the more force that is applied by the spring 50 to the wedge insert 40 which creates a greater damping effect.

Referring to FIGS. 5-7, second embodiment of the mechanical tensioner 110 is shown. The second embodiment of the mechanical tensioner 110 is similar to the mechanical tensioner 10 and the same reference numbers increased by 100 have been used to identify similar elements. In this case, the primary difference between the mechanical tensioner 110 and the mechanical tensioner 10 is that the wedge insert 140 has a trapezoidal wedge shaped as shown in FIGS. 6 and 7, with two generally planar wedge surfaces 142 instead of having a frustoconical shape. A tapered slot 124 is provided instead of the tapered opening 24, and the tapered slot 124 extends radially across an entire width of the plunger 120. The hollow wall portion 126 is formed as two separate halves divided by the slot 124.

The mechanical tensioner 110 functions in the same manner as the mechanical tensioner 10 in that as a force is applied to the plunger 220, the wedge insert 140 is forced into the tapered slot 124 by the spring 150 forcing the two segments of the hollow wall portion 126 outwardly in order to create greater friction against the walls of the bore 114 and provide controlled damping for the plunger 120. A friction coating or friction pads 144 may also be provided on an outer surface of the hollow wall portion 126 which slidingly engages in the bore 114 of the housing 112.

The amount of damping provided by the mechanical tensioners 10, 100 can be varied or adjusted based on changes in a number of factors, including the spring constant of the springs 50, 150, the angle α, the use and/or type of the frictions pads or coating 44, the material selection and finish for the slidingly mating parts, as well as the thickness of the hollow wall portion 26, 126 and/or number of slots 30.

Those skilled in the art will appreciate that various other modifications can be made to the mechanical tensioner 10, 110 described above which would still fall within the scope of the present invention which is defined by the appended claims.

What is claimed is:

1. A mechanical tensioner for a traction drive element, comprising:
   a housing with a bore having an open end and a closed bottom;
   a plunger having a first end located in the bore, the first end of the plunger having a tapered slot defined therein forming a hollow wall portion including two separate halves that are divided by the tapered slot, and the hollow wall portion is discontinuous in a circumferential direction;
   a trapezoidal wedge insert with two generally planar wedge portions is located at least partially in the tapered slot, the two generally planar wedge portions are complementary to the two separate halves of the hollow wall portion; and
   a spring located between the wedge insert and the closed bottom of the housing.

2. The mechanical tensioner of claim 1, wherein the tapered opening defines an angle α with respect to a longitudinal axis of the plunger, which is between 2° and 30°.

3. The mechanical tensioner of claim 2, wherein the tapered opening defines an angle α with respect to the longitudinal axis of the plunger, which between 6° and 15°.

4. The mechanical tensioner of claim 1, wherein an outer surface of the hollow wall portion is slidingly engaged in the bore in the housing and includes a friction coating or friction pads.

5. The mechanical tensioner of claim 1, wherein the tapered slot extends radially across a width of the plunger, and the wedge insert includes complementary surfaces to the tapered slot.

6. The mechanical tensioner of claim 5, wherein outer walls of the plunger in an area of the hollow wall portion defined by the slot are slidingly engaged in the bore.

7. The mechanical tensioner of claim 6, wherein the outer walls of the plunger in an area of the hollow wall portion include a friction coating or friction pads.

* * * * *